UNITED STATES PATENT OFFICE.

DANIEL F. DAVENPORT, OF AMERICUS, GEORGIA.

DISGUISING UNPALATABLE MEDICINES.

SPECIFICATION forming part of Letters Patent No. 617,956, dated January 17, 1899.

Application filed October 12, 1898. Serial No. 693,338. (No specimens.)

*To all whom it may concern:*

Be it known that I, DANIEL FREDERICK DAVENPORT, of Americus, in the county of Sumter and State of Georgia, have invented a new and useful Improvement in Mediums for Disguising Unpalatable Medicines, of which the following is a specification.

My invention relates to the composition of a solution or liquid for disguising unpalatable medicines by rendering them slowly soluble in the saliva, so that they shall be tasteless, or practically so, and afterward be more grateful and readily retained by the stomach; to the process of preparing such disguising solution or liquid, and to the process of rendering medicines which are repugnant—such, for example, as sulfate of quinia—palatable or practically tasteless, as hereinafter described.

My improved disguising solution is composed of the following ingredients, which are combined as stated: balsam of fir, refined, five hundred grains Troy; shellac, refined, two thousand grains Troy; alcohol, ninety-five per cent., twelve fluid ounces. Mix and allow balsam and shellac to dissolve. Then add olive-oil, pure, three and one-half fluid ounces. Shake well and allow solution to stand, preferably for twenty-four hours, agitating frequently, after which it will be ready for use.

This disguisant is adapted to render a number of unpalatable or nauseous drugs or medicines palatable or practically tasteless—such as many alkaloids, glucosides, and their derivatives—for example, sulfate of quinia, sulfate of morphia, caffein, salicin, aloes, pepper, and allied products.

For instance, to make a preparation of sulfate of quinia which shall be palatable or practically tasteless I proceed as follows: Take of the sulfate and thoroughly mix with the disguising liquid to form a paste. Heat the latter for several hours at 212° Fahrenheit, stirring the mass thoroughly at intervals of thirty minutes. The mass will then become hard and brittle, and, being allowed to cool, may be easily broken up into small particles preparatory to grinding it in a mill to such degree of comminution that it will pass through a sieve, No. 30 or No. 40 mesh preferred. After sifting, heat the product in a vessel for thirty minutes at a temperature of 212° Fahrenheit, being careful to stir well at intervals of fifteen minutes. Remove from heater, allow to cool, and bottle for use.

Sulfate of morphia and allied products, also caffein, salicin, aloes, and pepper, may be treated in substantially the same manner as sulfate of quinia to render them palatable.

I propose to use my disguising liquid to produce any powders, pills, tablets, or other forms of medicine put up in capsules or suspended in liquids.

I do not desire to limit myself to the use of alcohol, since some other solvent—ether, for example—may be employed, and in general I propose to use any other ingredients in place of those named which may perform, essentially, the same service.

What I claim is—

1. The improved preparation for disguising unpalatable medicines, the same comprising balsam of fir, shellac, alcohol, and olive-oil, substantially as specified.

2. The improved preparation for disguising unpalatable medicines, the same comprising balsam of fir, five hundred grains Troy, shellac, two thousand grains Troy, strong alcohol, twelve fluid ounces, and olive-oil three and one-half fluid ounces the same being intimately mixed to form a liquid, as specified.

3. The improved process of producing a disguising solution for use in preparing unpalatable medicines for consumption, which consists, first, in dissolving balsam of fir and shellac in alcohol, in the presence of olive-oil and mixing thoroughly, then allowing the liquid to stand a due time, the proportions of the several ingredients being preferably as hereinbefore specified.

4. The improved process of rendering an unpalatable drug or medicine practically tasteless, the same consisting in mixing with such medicines a liquid composed of balsam of fir, shellac, alcohol, and olive-oil, heating the pasty mass thus formed, then allowing it to cool, reducing the same to small particles, and reheating it, substantially as shown and described.

DANIEL F. DAVENPORT.

Witnesses:
B. K. MARSHALL,
JOE. L. BROWN.